United States Patent
Wilhelm et al.

(10) Patent No.: US 8,093,834 B2
(45) Date of Patent: Jan. 10, 2012

(54) AUTOMOTIVE HID HEADLAMP BALLAST CONTROL IC

(75) Inventors: Dana Wilhelm, Temple City, CA (US); Peter Green, Redondo Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 557 days.

(21) Appl. No.: 12/026,044

(22) Filed: Feb. 5, 2008

(65) Prior Publication Data

US 2008/0211425 A1 Sep. 4, 2008

Related U.S. Application Data

(60) Provisional application No. 60/888,371, filed on Feb. 6, 2007.

(51) Int. Cl.
*H05B 37/02* (2006.01)

(52) U.S. Cl. .................................... 315/307; 315/291

(58) Field of Classification Search .............. 315/209 R, 315/224, 225, 276, 291, 307

See application file for complete search history.

(56) References Cited

U.S. PATENT DOCUMENTS

| | | | | |
|---|---|---|---|---|
| 5,463,287 A * | 10/1995 | Kurihara et al. | ............... | 315/307 |
| 5,486,740 A * | 1/1996 | Yamashita et al. | ............. | 315/308 |
| 7,378,804 B2 * | 5/2008 | Mitsuyasu et al. | ............ | 315/247 |
| 2006/0197470 A1 * | 9/2006 | Ribarich et al. | ............... | 315/291 |

* cited by examiner

*Primary Examiner* — Jacob Y Choi
*Assistant Examiner* — Jimmy Vu
(74) *Attorney, Agent, or Firm* — Farjami &Farjami LLP

(57) ABSTRACT

A ballast control integrated circuit for a ballast driving a high intensity discharge (HID) lamp. The control integrated circuit has a first circuit for controlling a DC to DC converter receiving a first DC voltage and providing an increased DC voltage. The first circuit includes a driver for providing a pulsed signal to drive a first switch coupled to a flyback transformer of the DC to DC converter. A second circuit controls a DC to AC converter, the second circuit controlling a switching circuit receiving the increased DC voltage and driving the HID lamp with an AC voltage. The second circuit has a driver circuit for driving the switching circuit. The switching circuit is an H-bridge switching circuit coupled to drive the HID lamp.

16 Claims, 5 Drawing Sheets

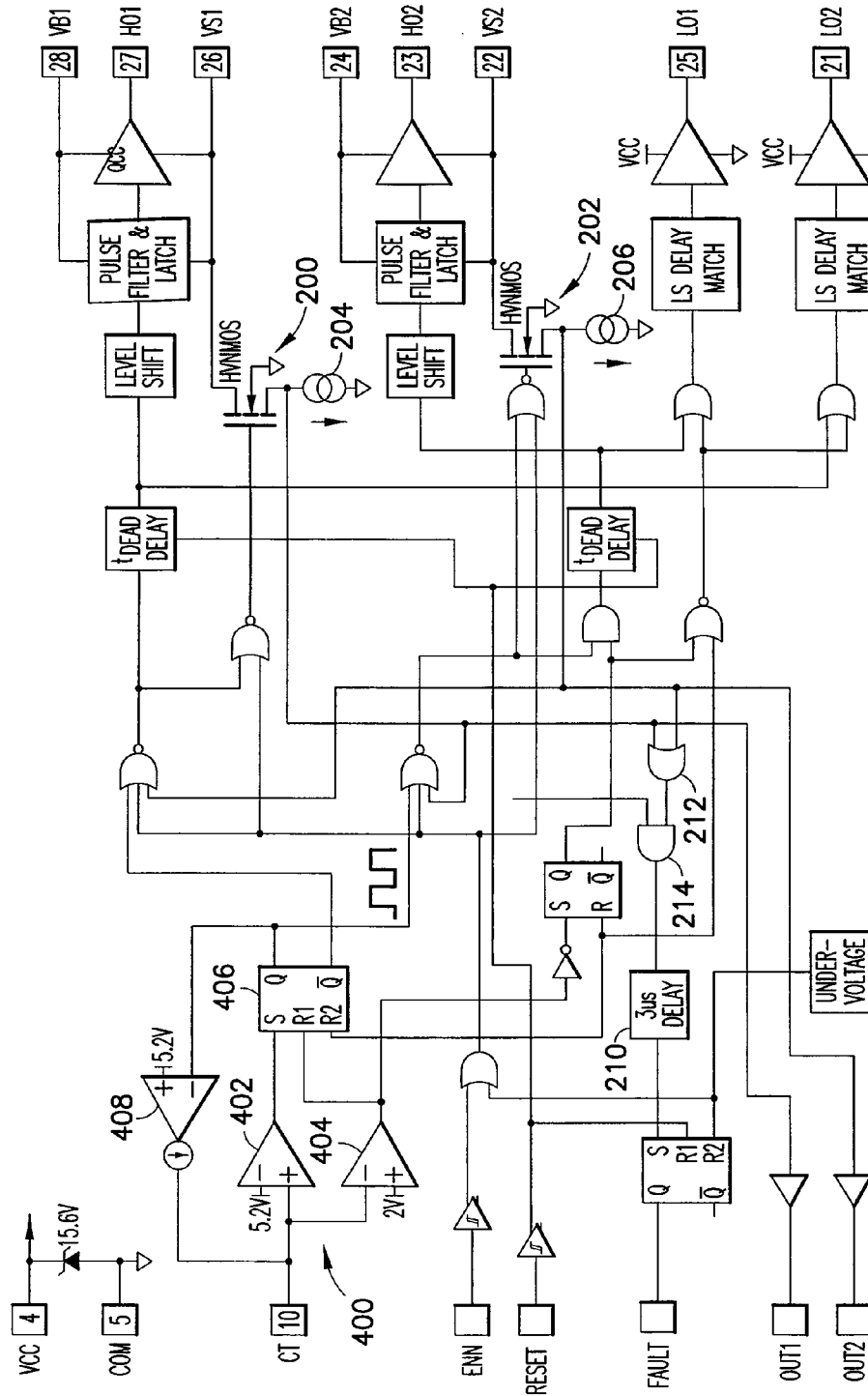
FIG.5 FULL BRIDGE DRIVER

AUTOMOTIVE HID HEADLAMP BALLAST CONTROL IC

CROSS REFERENCE TO RELATED APPLICATIONS

This application claims the benefit and priority of U.S. Provisional patent application Ser. No. 60/888,371 filed Feb. 6, 2007 entitled AUTOMOTIVE HID HEADLAMP BALLAST CONTROL IC, the entire disclosure of which is incorporated herein by reference.

BACKGROUND OF THE INVENTION

The High Intensity Discharge (HID) headlight system, utilizing a Xenon Metal Halide lamp, has become increasingly popular due to its substantially superior luminous efficacy, measured in Lumens per Watt, as compared with a conventional Halogen headlight. The typical HID car headlamp consumes 35 Watts of electrical power. The HID lamp, however, unlike the Halogen lamp, is a discharge lamp, which requires an electronic ballast to ignite and operate it. The size, complexity and therefore cost of such ballasts has been a limiting factor in the adoption of HID headlights. An ideal solution would be to produce a ballast small enough to fit inside a headlight housing, having a low cost and high efficiency.

SUMMARY OF THE INVENTION

The present invention is directed to a control integrated circuit that provides all of the core functionality required in an automotive HID ballast circuit, comprising a high frequency DC to DC converter and low frequency DC to AC converter. The ballast must be able to survive being connected to the car battery with the polarity reversed, without sustaining damage. It must be capable of igniting the lamp, whether it is hot or cold and must produce the maximum light output from the lamp as rapidly after ignition as possible. During running, the ballast must maintain a constant regulated power to the lamp. The ballast must also be capable of operating over a wide range of input voltage, to accommodate all possible states of battery discharge and be able to survive voltage surges that can occur in the automotive environment.

An important difference between the automotive HID ballast and an off line ballast, is that it is essential that the automotive unit be able to reliably and consistently re-ignite a hot lamp. Hot re-striking of an HID lamp requires a much higher ignition voltage pulse, on the order of 20KV. Therefore an igniter module is required, which contains circuitry that can provide this. The igniter module is also housed preferably in the head light assembly, or incorporated into the lamp base socket. The HID ballast needs to provide an auxiliary negative voltage to trigger this igniter module, which is normally around 700V.

According to the invention, a ballast control integrated circuit for a ballast driving a high intensity discharge (HID) lamp is provided, the control integrated circuit comprising a first circuit for controlling a DC to DC converter receiving a first DC voltage and providing an increased DC voltage, the first circuit including a driver for providing a pulsed signal to drive a first switch coupled to a flyback transformer of the DC to DC converter; and a second circuit for controlling a DC to AC converter, the second circuit controlling a switching circuit receiving the increased DC voltage and driving the HID lamp with an AC voltage, the second circuit comprising a driver circuit for driving the switching circuit, the switching circuit comprising an H-bridge switching circuit coupled to drive said HID lamp.

Other features and advantages of the present invention will become apparent from the following description of the invention which refers to the accompanying drawings.

BRIEF DESCRIPTION OF THE DRAWING(S)

The invention will now be described in greater detail in the following detailed description, with reference to the drawings, in which:

FIG. 5 shows another portion of the ballast, specifically the DC/AC inverter full bridge driver control section.

DETAILED DESCRIPTION OF PREFERRED EMBODIMENTS OF THE INVENTION

Figure 2:
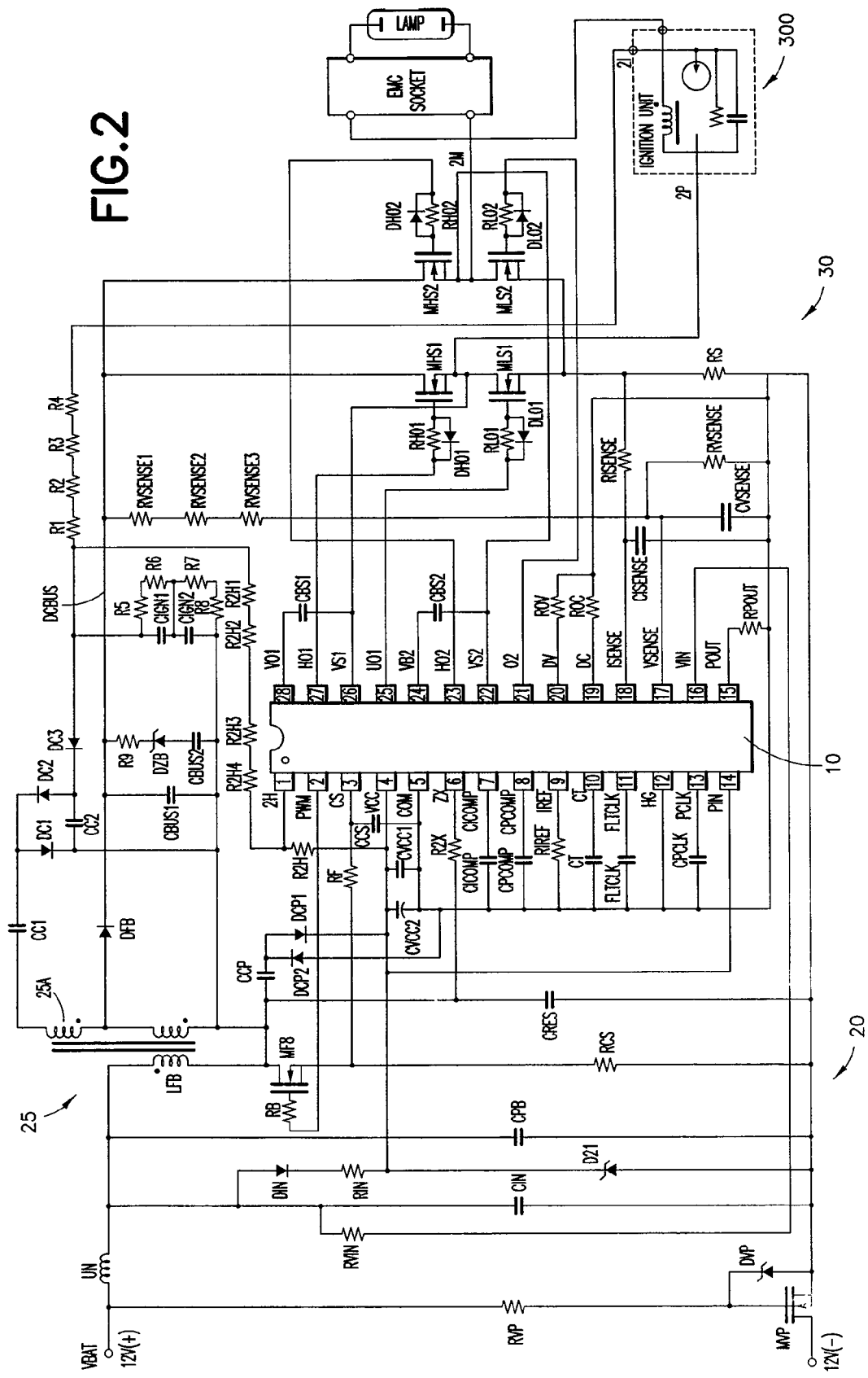
FIG. 2 shows a circuit diagram of the ballast.

With reference now to the drawings, a ballast circuit according to the invention is shown in FIG. 2. The circuit illustrates the relatively small number of external electronic components that are needed in this system. The IC 10 incorporates all of the control and diagnostic functions required. The IC 10 may be broken down into several distinct functional blocks.

Figure 3:
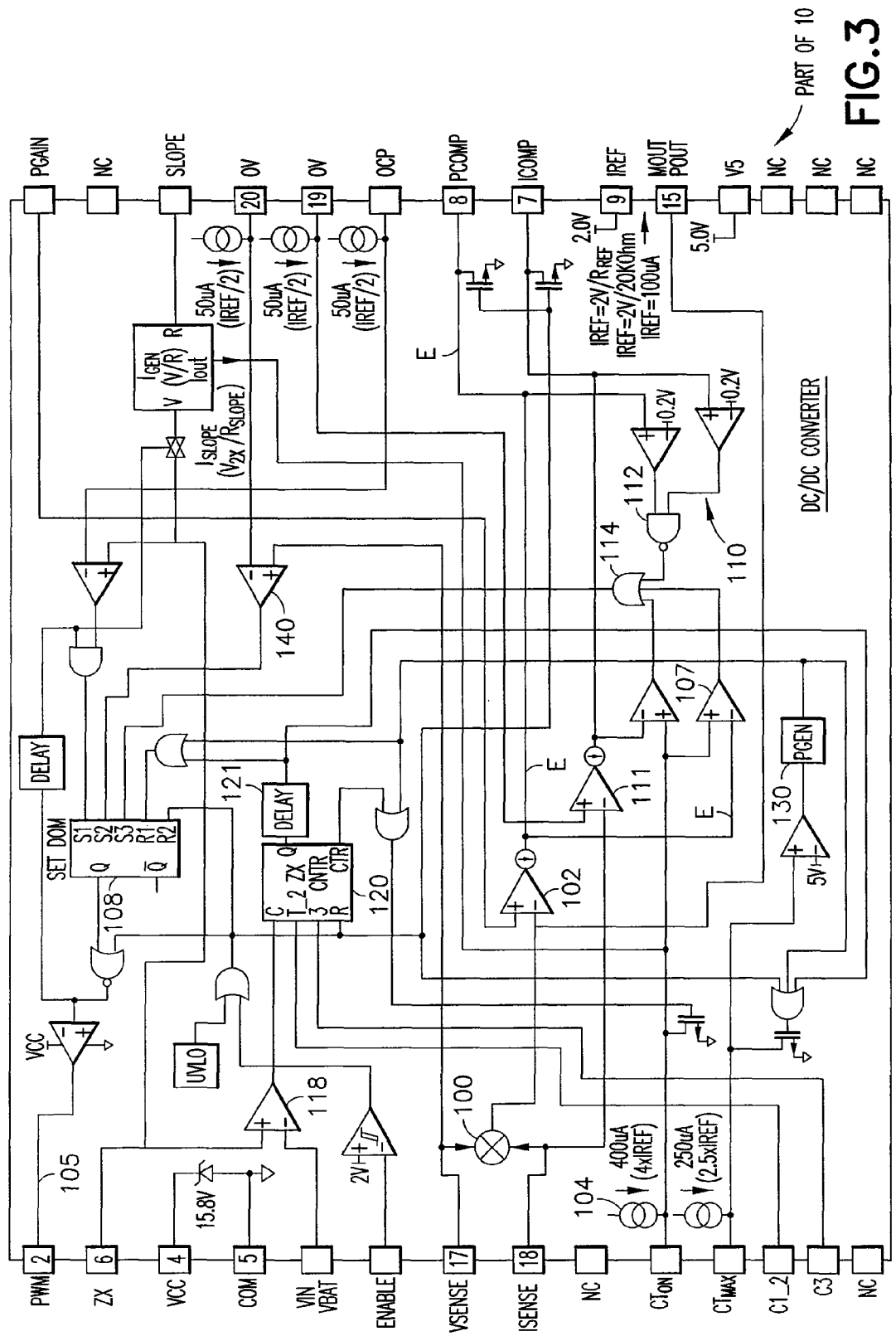
FIG. 3 shows a portion of the ballast block diagram, specifically, the DC/DC converter control section.

The first of these blocks comprises a synchronous DC to DC converter 20, designed to operate at switching frequencies up to 600 KHz, in order to allow small planar inductors to be used in the system, which require only a very small number of windings, allowing the option to incorporate them in the copper traces of a four layer printed circuit board. The DC to DC converter section 20 is based on a synchronous flyback topology, which is the preferred arrangement, since this allows a switching MOSFET MFB to be used that has a 100V maximum drain to source voltage rating, although the output voltage may be up to 400V at the DC bus, in order to provide sufficient ignition voltage. Of course, higher voltage MOSFETs can be used, but using a relatively low voltage MOSFET reduces costs. Since isolation is not required in the DC to DC converter section of the ballast, the Flyback transformer 25 may have a single winding (auto transformer), with a tapping in the appropriate position, thus saving some additional windings. The DC to DC converter control section of the IC 10 is shown in FIG. 3, which shows a more detailed view of its internal operation.

The DC to DC converter section 20 is controlled by a portion of the IC 10. Another portion of IC 10 controls the DC to AC inverter section 30, including the full bridge comprising transistors MHS1, MLS1 and MHS2 and MLS2.

The DC to DC converter 20 includes the switch MFB, whose gate is controlled by a PWM signal from IC 10. The switch MFB allows current to pass through the flyback LFB primary. The energy stored in the primary is discharged to the secondary winding when switch MFB opens, developing a high voltage ($\approx$400V) on the DC bus after rectification by diode DFB.

IC 10 includes a current sense CS (developed across resistor RCS), various timing elements for developing the oscillator frequency and other control and compensation functions (CT, CPCKL, FLTCLK, RIREF, CPCOMP, CICOMP, RZX, CRES) and power inputs VCC and COM. A start-up voltage is developed from the series circuit of diode DIN and resistor RIN, clamped by zener DZ1. VCC is developed after the circuit is operational by a charge pump comprising CCP, DCP1 and DCP2 from the drain voltage at switch MFB. Capacitors CVCC1 and CVCC2 provide VCC filtering. Capacitor CFB provides input bulk storage. A transistor switch MVP, resistor RVP and zener DVP are provided for battery polarity reversal protection, to disconnect power in the event of battery reversal.

Turning to FIG. 3, the DC to DC converter section 20 regulates the power applied to the lamp. The DC bus voltage VSENSE and current ISENSE are fed to an analog multiplier circuit 100 which provides a power signal. The output is fed to error amplifier 102 and compared to power reference PGAIN. The error amplifier provides an error voltage E that determines the on time of the PWM gate drive signal 105 that is applied to the switching MOSFET MFB of the flyback circuit. The error voltage E is connected to an external compensation capacitor CPCOMP (connected to PCOMP in FIG. 3). An oscillating ramp waveform is produced at the CT on pin, by means of a current source 104 within the IC and an external capacitor CT. This is compared in a comparator 107 with the error voltage E, and sets the on time for the gate drive PWM signal via gate 114 and latch 108.

The IC 10 also includes a maximum load current limit circuit 110. An additional error voltage is produced at the ICOMP pin (FIG. 3) by error amplifier 111. If the voltage at ICOMP is lower than the voltage at PCOMP, then the ICOMP voltage will limit the on time and the PCOMP signal will be ignored. This condition normally will only occur during the warm up phase that lasts for a short period immediately after ignition of the HID lamp. During this phase the lamp voltage will be of the order of 10V and the current will be very high. It is necessary for the lamp current to be limited at this time, until the lamp voltage rises and the current falls as the lamp reaches its steady state run mode. The maximum current limit is set by a resistor connected from the OC pin to COM that provides a limiting voltage reference to amplifier 111. Circuit 110 comprises two comparators providing their outputs to gate circuits 112, 114 which then controls latch 108 to limit the on time.

Figure 4:
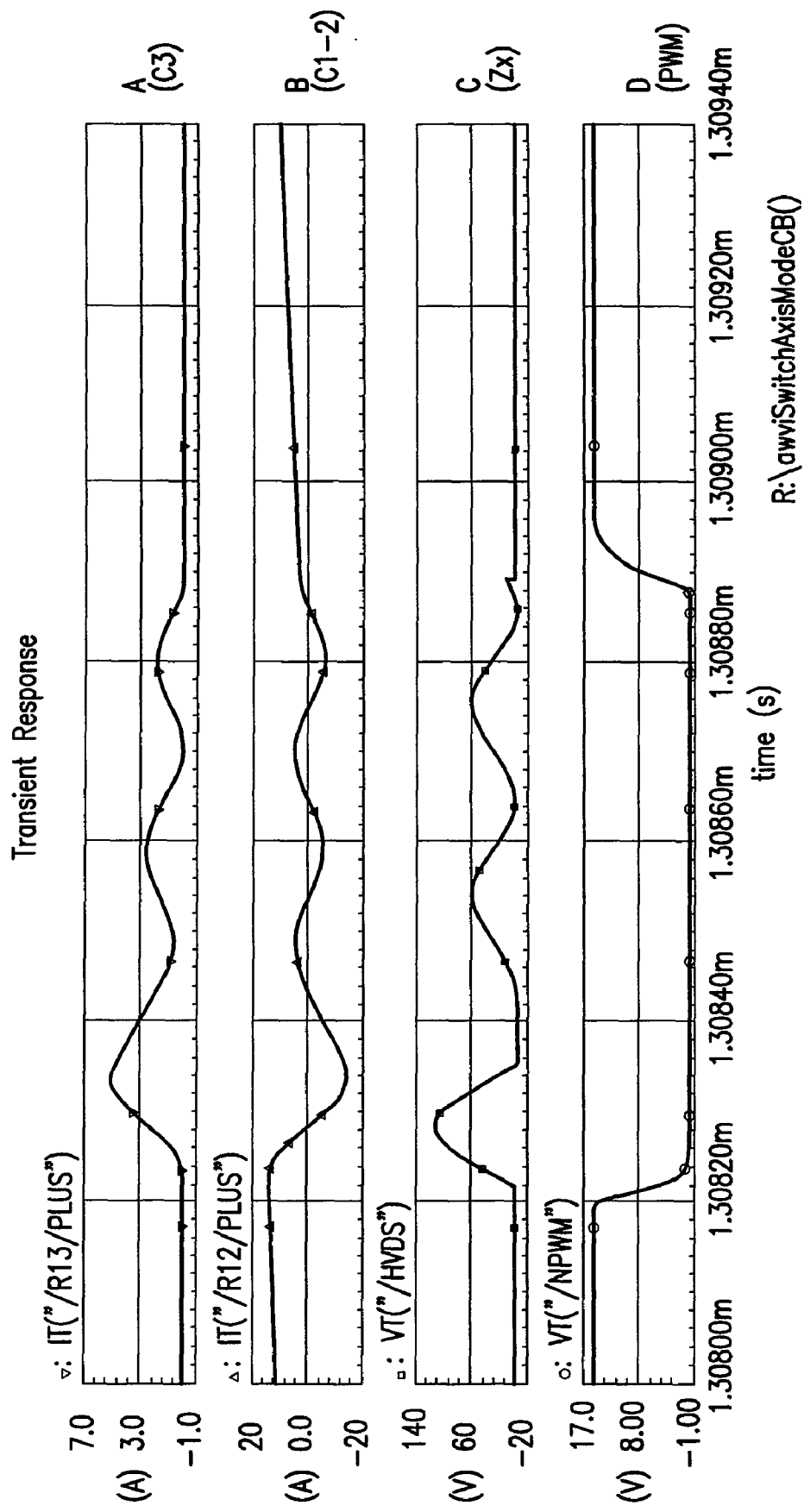
FIG. 4 shows waveforms in the ballast circuit.

When the switching MOSFET MFB switches off, a "ringing" voltage will occur at the drain, which is shown in FIG. 4C. In order to minimize switching losses, the MOSFET MFB needs to switch on again at a point when the drain voltage is close to zero. The IC 10 contains a circuit (comparator 118) that detects when the drain voltage, monitored at the ZX pin via RZX, crosses the battery input voltage VBAT. There is a fixed internal delay provided by delay block 121, before the PWM output then goes high again, to allow the drain voltage to fall from the battery voltage to its minimum level, as shown in FIG. 4D. The IC includes a counter 120, so that the PWM output may go high after the first, second or third transition of the ZX pin voltage, enabling the designer to determine the range of switching frequency over which the system will operate. In this system the frequency must vary with changes in line and load. Whether the PWM output is set high at the first, second or third transition, can be selected by a metal mask option in the IC, or by adding additional logic, can be automatically selected internally to maintain the switching frequency within a desired window. In FIG. 4, the third transition has been selected, as can be seen from FIG. 4D, where the PWM pulse begins after the third transition of FIG. 4C.

Under some operating conditions the ZX detection scheme, described above, will not operate and so an additional timer 130 at the CTMAX pin has been added, to set a maximum default off time. This is not shown in FIG. 2.

The DC to DC block of FIG. 3 also contains a circuit to limit the maximum voltage that may be developed at the DC bus before the lamp has ignited. The bus voltage is sensed at the VSENSE pin and compared in a comparator 140 to an over voltage reference that is set by connecting a resistor ROV from the OV pin to COM. In this way, prior to ignition of the lamp, when there is no current in the load and the voltage is high, the voltage will be limited to a safe level by appropriate control of the PWM pulses.

Further, the DC to DC converter control circuit of FIG. 3 preferably operates so that the flyback transformer operates in continuous mode when the HID lamp is drawing current above a threshold value when the HID lamp is warming up and in discontinuous mode when the HID lamp is drawing current below the threshold during steady state operation.

The second functional block of the IC, shown in FIG. 5, comprises an H-bridge driver that contains two separate floating high side wells, but which contains additional circuitry for detecting the correct slewing of the half bridge voltages during the dead time. The purpose of this additional circuitry is to detect a possible fault in the load and in this event, cause the IC to shut down, since the half bridge voltage is unable to slew correctly under open or short circuit conditions. This function is realized by adding high voltage NMOS devices 200, 202 from both VS1 and VS2, to the low side circuitry of the IC, pulled down in each case by a current source 204, 206. When the top-side switch of one side of the H-bridge switches off, the voltage at the mid point VS1, VS2 will slew to 0V as a result of commutation that occurs due to the series inductance in the igniter 300 (see FIG. 2. When this voltage slews to 0V, the voltage inside the IC at the source of the corresponding high voltage NMOS device 200, 202, transitions from high to low providing a signal to the logic circuitry. The IC 10 contains a timer circuit 210 fed by gates 212 and 214 that waits for 3 uS for this transition to occur and then sets the IC into shutdown mode via signal FAULT if it does not occur. Under normal conditions, when the signal does occur within 3 uS, then the low side switch of that side of the H-bridge will be switched on, along with the opposing high side switch of the other side. At switch off of the high side switch on that side, an identical circuit will be used to detect the slew to 0V in the same way via the other terminal VS1 or VS2.

The H-bridge driver block also contains an oscillator 400, which in this application is designed to run at frequencies in the range of hundreds of Hertz. The oscillator is connected to the capacitor CT and includes comparators 402 and 404, latch 406 and comparator 408 to reset the capacitor CT. The oscillator allows the capacitor CT to charge to 5.2v, setting the latch 406 via comparator 402 and producing an output that discharges the capacitor via comparator 408. When the capacitor goes below 2v, the latch is reset by comparator 404 and the cycle continues. The block diagram in FIG. 5 has some additional connections added for monitoring various internal signals that are not required in the final part. In addition, the detection circuitry described above may be disabled and the IC configured to run with an internally fixed dead time. This ability would be retained in the final part, although it would only be selectable as a metal mask option.

The third functional block contains circuitry for realizing the logic state machine that controls the modes of operation of the system. The state machine is illustrated in the state diagram of FIG. 1. There are several stages of self test through which the system will proceed, before reaching the point where lamp ignition will be attempted.

Figure 1:
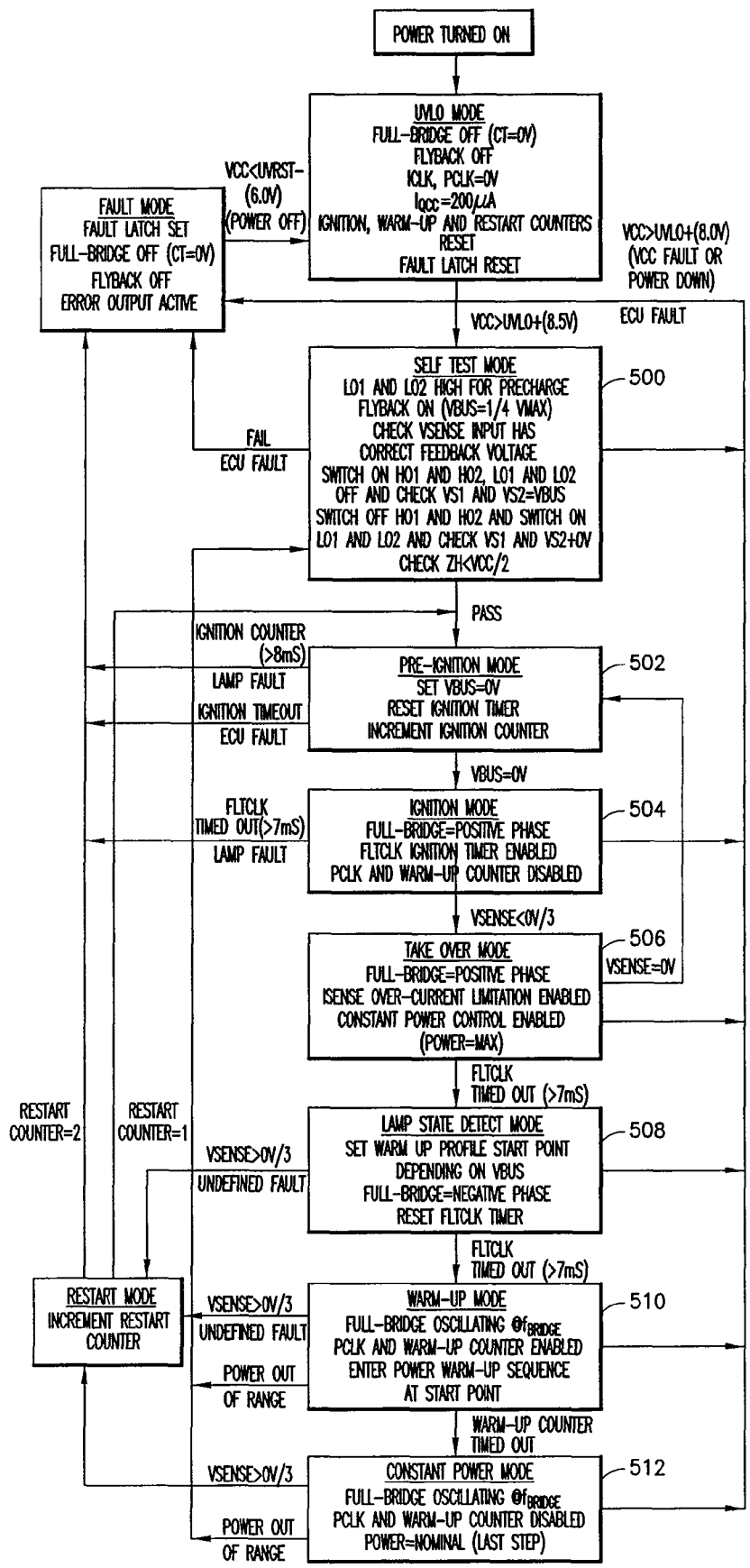
FIG. 1 shows the state diagram of the ballast circuit according to the invention.

Turning to FIG. 1, the first state that the IC will enter is the self test mode 500. In this mode the DC to DC converter section is enabled enough to produce a reduced voltage at the DC bus, which is then measured to establish that this section is operating correctly. In the event of damaged components being present in this section, the IC will shut down. Next the high side switches of the H-bridge section are both switched on after having pre-charged both bootstrap capacitors DBS1 and CBS2. Voltage is detected at the mid point VS, of each side of the H-bridge to determine that the level shifting circuitry and high side switches are operating correctly. Next the high side switches are both switched off and both low side switches are switched on and the VS voltage is detected to ensure it has now dropped to 0V. If at any stage the correct voltage is not detected the IC will shut down. During this phase the negative auxiliary voltage to the igniter is also sensed at ZH via divide resistors RZH and RZH1 to RZH4 to ensure that it is present. The negative auxiliary voltage is produced by winding 25 A of flyback transformer 25 and rectification by diode DC3. After passing the self test mode, the IC will enter the pre-ignition mode 502, in which the DC bus voltage is raised to ignition level. At this point if the ignition does not occur within a set time, the IC will shut down. Additionally, if the IC has attempted unsuccessfully to ignite the lamp more than a specified number of times, then the IC will again shut down.

During the self testing 500 and ignition modes 504, 506 and 508, the H-bridge will remain with one side switched on, supplying a DC voltage directly to the output for an internally defined time of several milliseconds. After this, the polarity will be reversed (508) for an equal period. After ignition has been detected, by sensing a substantial drop in the bus voltage through the VSENSE pin, the IC will detect if the lamp has immediately extinguished after ignition. This tends to happen in HID systems if the lamp has reached the end of its life. This can also happen when the lamp is in good condition, so it is necessary to attempt to ignite the lamp several times before determining that this is not possible and shutting down. It is undesirable to continue to try to ignite the lamp indefinitely, as this would result in unnecessary stress on both the ballast and the igniter. If the lamp has ignited successfully and remains in an operational state, the DC bus voltage will gradually rise, allowing the system to enter into warm-up mode 510. At this stage the H-bridge oscillator will start up providing a low frequency AC drive voltage to the lamp, which is necessary for maximizing the lamp life. Once the lamp is warmed-up, and the warm-up counter has timed out, the ballast enters the constant power mode.

Since the ballast is required to start up at low voltages, it is necessary to ensure that adequate VCC supply voltage for the IC be provided. If the input voltage from the battery is very low, then the IC will detect this condition and in this case the DC to DC converter section will begin to operate but the H-bridge section will remain off. In this way the system will not be able to attempt to ignite the lamp and the DC bus voltage should rise to its maximum value of approximately 40 QV. It is not desirable to operate the H-bridge MOSFETs unless there is sufficient voltage at VCC to provide high enough gate drive voltages to ensure that the MOSFETs are fully switched on, otherwise these may operate in the linear region, causing increased power dissipation and possible damage to the ballast. If the DC to DC section operates first, then it becomes possible for the VCC supply to the IC, to be obtained either through a charge pump connected to the drain of the switching device in the flyback section (CCP, DCP1, DCP2, CVCC1, CVCC2—see FIG. 2), or through resistors connected to the DC bus. In either case there are tradeoffs in the efficiency of the DC to DC section. When the VCC supply has reached an adequate level, the H-bridge section is enabled and normal operation may continue. If necessary MOSFET MFB of the DC to DC converter section can be a MOSFET with a logic level gate threshold, which is not feasible for the H-bridge section as these devices need to be rated at a much higher voltage.

The ballast must also be able to withstand high voltage surges from the battery input, without sustaining damage. In the case of a load dump, a voltage of up to 60V may occur at the input for several milliseconds. This necessitates including a resistor RIN at the input of the ballast to the VCC of the IC and also an external zener diode DZ1 or transistor clamp, that can absorb the excess power created in this case. The IC includes a battery monitoring input VBAT (VIN) that is used to detect low or high input voltage conditions so the IC may react accordingly.

The IC should also include circuitry for creating the warm up profile required by the lamp, in order to bring the light output to its nominal level as quickly as possible. A cold HID lamp emits a significantly reduced light output until it reaches a hot running temperature. An increased light output from the cold lamp is produced by applying an increased power to the lamp, until the lamp reaches the correct running temperature. Over driving the lamp also causes the temperature to rise to the required running level more rapidly. This function is accomplished by setting a higher power reference at PGAIN immediately after ignition so that when the lamp has ignited and after the short period where it runs at maximum current limit, the power control loop drives the lamp at a level far above its rated power. A timing circuit is triggered after ignition so that as time progresses, the power level is gradually reduced until the lamp reaches its correct rated power. This operation can occur in several steps so that the light output of the headlight remains reasonably constant and so that steps in power are not noticeable. It is also proposed to include circuitry that detects the lamp voltage immediately after ignition, which is significantly higher when the lamp is already hot, and to use this information to disable the overdrive function or to cause the overdrive to operate starting at a lesser degree of increased power when the lamps are already hot.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A ballast control integrated circuit for a ballast driving a high intensity discharge (HID) lamp, the control integrated circuit comprising:

a first circuit for controlling a DC to DC converter receiving a first DC voltage as input and providing an increased DC voltage as output, the first circuit including a driver for providing a pulsed signal to drive a first switch coupled to a flyback transformer of the DC to DC converter; and a second circuit for controlling a DC to AC converter, the second circuit controlling a switching circuit receiving the increased DC voltage and driving the HID lamp with an AC voltage, the second circuit comprising a driver circuit for driving the switching circuit, the switching circuit comprising an H-bridge switching circuit coupled to drive said HID lamp;

said first circuit also including a circuit for sensing said first DC voltage, and if said first DC voltage is below a threshold, for enabling said first circuit to produce said increased DC voltage and for delaying operation of said second circuit until an adequate supply voltage for said control integrated circuit is provided to operate said driver circuit of said second circuit to ensure that switches in said switching circuit are driven fully on by said driver circuit.

2. The ballast control integrated circuit of claim 1, wherein the supply voltage is provided from a charge pump connected to said first switch or through a resistor connected to a supply of the increased DC voltage.

3. The ballast control integrated circuit of claim 1, wherein the first circuit comprises a circuit for monitoring the increased DC voltage and current to the HID lamp, generating a signal proportional to the lamp power from said monitored voltage and current, producing a first error signal by comparing the signal proportional to the lamp power to a reference power value and using said first error signal to control the pulse duration of said pulsed signal to drive the HID lamp to the power level set by the reference power level.

4. The ballast control integrated circuit of claim 1, wherein the first circuit drives said first switch so that said flyback transformer operates in continuous mode when the HID lamp is drawing current above a threshold value when the HID lamp is warming up and in discontinuous mode when the HID lamp is drawing current below said threshold value during steady state operation of the HID lamp.

5. The ballast control integrated circuit of claim 3, further comprising a maximum load current limit circuit for limiting the maximum load current to said HID lamp.

6. The ballast control integrated circuit of claim 5, wherein said maximum load current limit circuit comprises a circuit for comparing the current to said HID lamp to a reference overcurrent value and for producing a second error signal, further comprising a circuit comparing said first and second error signals and for providing a signal to limit the pulse duration of the drive signal to said first switch if the maximum load current is exceeded.

7. The ballast control integrated circuit of claim 6, further comprising a circuit monitoring a voltage at said first switch and for turning on said first switch when said voltage is close to zero.

8. The ballast control integrated circuit of claim 7, wherein said voltage comprises the drain voltage of said first switch and further comprising a comparator for comparing said voltage to the input DC voltage and determining when the drain voltage crosses the input DC voltage and generating an input voltage transition, further comprising a delay circuit for delaying the turn-on of said first switch until a selected number of input voltage transitions are counted.

9. The ballast control integrated circuit of claim 8, wherein said delay circuit comprises a counter circuit for counting said input voltage transitions.

10. The ballast control integrated circuit of claim 9, wherein said delay circuit has a maximum delay time setting a maximum default off time of said first switch.

11. The ballast control integrated circuit of claim 1, wherein said second circuit comprises a sense circuit for sensing a voltage at a node between transistor switches in each bridge of said H bridge switching circuit and providing a transition signal when said voltage makes a transition and further comprising a circuit receiving said transition signal and for generating a fault signal if said transition signal does not occur within a preset time.

12. The ballast control integrated circuit of claim 2, further wherein said first circuit provides a higher power reference immediately after ignition to overdrive the HID lamp until the HID lamp reaches an operating temperature.

13. The ballast control integrated circuit of claim 12, wherein said first circuit reduces the higher power reference gradually over a preset time period until the HID lamp reaches the operating temperature.

14. The ballast control integrated circuit of claim 1, further comprising a state machine logic block for controlling the operation of the first and second circuits amongst a plurality of operating states, including a pre-ignition mode, an ignition mode, a warm-up mode and a constant power mode.

15. The ballast control integrated circuit of claim 14, wherein the state machine logic block also implements a UVLO mode, a self test mode, a take-over mode and a lamp state detect mode.

16. The ballast control integrated circuit of claim 15, wherein the state machine logic block also implements a restart mode and a fault mode.

* * * * *